US012711015B2

(12) United States Patent
Meshram et al.

(10) Patent No.: US 12,711,015 B2
(45) Date of Patent: Aug. 18, 2026

(54) SYSTEMS AND METHODS FOR PROVIDING A DELAYED DATABASE CLUSTER

(71) Applicant: JPMORGAN CHASE BANK, N.A., New York, NY (US)

(72) Inventors: Amit Meshram, Romansville, PA (US); Rowen Holt, Hoboken, NJ (US); Alain Carlos, Ridgewood, NY (US); Madhu Kolla, Northville, MI (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/435,467

(22) Filed: Feb. 7, 2024

(65) Prior Publication Data

US 2025/0252022 A1 Aug. 7, 2025

(51) Int. Cl.
*G06F 11/00* (2006.01)
*G06F 11/1446* (2026.01)

(52) U.S. Cl.
CPC ...... *G06F 11/1451* (2013.01); *G06F 11/1469* (2013.01); *G06F 2201/80* (2013.01)

(58) Field of Classification Search
None
See application file for complete search history.

(56) References Cited

U.S. PATENT DOCUMENTS 9,483,485 B1 * 11/2016 Chockalingam .... G06F 11/1451
10,936,545 B1 * 3/2021 Chockalingam .... G06F 11/1448
2009/0313311 A1 * 12/2009 Hoffmann ........... G06F 11/2097
2010/0191884 A1 * 7/2010 Holenstein .......... G06F 16/2343 707/613
2011/0320403 A1 * 12/2011 O'Krafka .............. G06F 16/273 707/E17.007
2015/0286535 A1 * 10/2015 Kushwah ............ G06F 11/1451 707/646
2015/0317208 A1 * 11/2015 Desantis ............. G06F 11/1448 707/643
2017/0004047 A1 * 1/2017 Deshmukh .......... G06F 11/1448
2017/0075765 A1 * 3/2017 Chen ................... G06F 16/2358
2018/0157521 A1 * 6/2018 Arikatla .............. G06F 9/45558
2018/0300205 A1 * 10/2018 Sehgal ................ G06F 11/1451
2019/0311040 A1 * 10/2019 Nayak ................. G06F 11/0751
2021/0279151 A1 * 9/2021 Sarkar ................. G06F 11/1469
2021/0357293 A1 * 11/2021 Mathew ................ G06F 16/215
(Continued)

*Primary Examiner* — Farhan M Syed
(74) *Attorney, Agent, or Firm* — GREENBERG TRAURIG LLP

(57) ABSTRACT

In some aspects, the techniques described herein relate to a method including: receiving, at a data management platform, incoming data; writing the incoming data to a primary database cluster; executing an incremental backup operation, wherein the incremental backup operation generates an incremental backup of the primary database cluster; storing the incremental backup of the primary database cluster in a storage location; after a predetermined amount of time, executing an incremental restore operation on a delayed database cluster, wherein the incremental restore operation restores the incremental backup of the primary database cluster to the delayed database cluster; determining a data anomaly in the incoming data; and executing a failover command, wherein the failover command redirects database queries from the primary database cluster to the delayed database cluster.

20 Claims, 3 Drawing Sheets

(56) References Cited

U.S. PATENT DOCUMENTS

2023/0020330 A1* 1/2023 Schwerin .............. G06F 16/119
2023/0281082 A1* 9/2023 Hoang .................. G06F 9/5033
707/639
2025/0021448 A1* 1/2025 Schreter .............. G06F 11/1435

* cited by examiner

SYSTEMS AND METHODS FOR PROVIDING A DELAYED DATABASE CLUSTER

1. FIELD OF THE DISCLOSURE

Aspects generally relate to systems and methods for providing a delayed database cluster.

2. DESCRIPTION OF THE RELATED ART

Database engines and clusters are relied on to provide stored data from an organization's backend technology infrastructure to front-end interfaces that are accessed by both internal and external users (e.g., customers). Often times, the data is historic in nature (e.g., historic transactions, records, etc.). In a scenario, such as a data corruption scenario, where a data source must be recovered via a disaster recovery plan, system users may be unable to use systems while the data is restored, which may take several hours or even several days. In such a scenario, it would be beneficial to provide users with access to most, or even some of the stored data a system is configured to provide even if the provided data does not include the most recent data.

SUMMARY

In some aspects, the techniques described herein relate to a method including: receiving, at a data management platform, incoming data; writing the incoming data to a primary database cluster; executing an incremental backup operation, wherein the incremental backup operation generates an incremental backup of the primary database cluster; storing the incremental backup of the primary database cluster in a storage location; after a predetermined amount of time, executing an incremental restore operation on a delayed database cluster, wherein the incremental restore operation restores the incremental backup of the primary database cluster to the delayed database cluster; determining a data anomaly in the incoming data; and executing a failover command, wherein the failover command redirects database queries from the primary database cluster to the delayed database cluster.

In some aspects, the techniques described herein relate to a method, wherein the incoming data is streaming data received by a data consumption application, and wherein the data consumption application is configured as a consumer of a distributed event streaming platform.

In some aspects, the techniques described herein relate to a method, wherein the storage location is a network storage location.

In some aspects, the techniques described herein relate to a method, including: executing a full backup operation, wherein the full backup operation generates a full backup of the primary database cluster.

In some aspects, the techniques described herein relate to a method, including: prior to executing the incremental restore operation on the delayed database cluster, initiating a one-time load of static database tables from the primary database cluster to the delayed database cluster.

In some aspects, the techniques described herein relate to a method, including: prior to executing the incremental restore operation on the delayed database cluster and after initiating the one-time load of static database tables from the primary database cluster to the delayed database cluster, executing a full restore operation on the delayed database cluster, wherein the full restore operation restores the full backup of the primary database cluster to the delayed database cluster.

In some aspects, the techniques described herein relate to a method, wherein the failover command triggers a message to be displayed on user interfaces that access the delayed database cluster, and wherein the message indicates that data retrieved from the delayed database cluster is from a truncated dataset.

In some aspects, the techniques described herein relate to a system including at least one computer including a processor and a memory, wherein the at least one computer is configured to: receiving, at a data management platform, incoming data; writing the incoming data to a primary database cluster; executing an incremental backup operation, wherein the incremental backup operation generates an incremental backup of the primary database cluster; storing the incremental backup of the primary database cluster in a storage location; after a predetermined amount of time, executing an incremental restore operation on a delayed database cluster, wherein the incremental restore operation restores the incremental backup of the primary database cluster to the delayed database cluster; determining a data anomaly in the incoming data; and executing a failover command, wherein the failover command redirects database queries from the primary database cluster to the delayed database cluster.

In some aspects, the techniques described herein relate to a system, wherein the incoming data is streaming data received by a data consumption application, and wherein the data consumption application is configured as a consumer of a distributed event streaming platform.

In some aspects, the techniques described herein relate to a system, wherein the storage location is a network storage location.

In some aspects, the techniques described herein relate to a system, including: executing a full backup operation, wherein the full backup operation generates a full backup of the primary database cluster.

In some aspects, the techniques described herein relate to a system, wherein the at least one computer is configured to: prior to executing the incremental restore operation on the delayed database cluster, initiating a one-time load of static database tables from the primary database cluster to the delayed database cluster.

In some aspects, the techniques described herein relate to a system, wherein the at least one computer is configured to: prior to executing the incremental restore operation on the delayed database cluster and after initiating the one-time load of static database tables from the primary database cluster to the delayed database cluster, executing a full restore operation on the delayed database cluster, wherein the full restore operation restores the full backup of the primary database cluster to the delayed database cluster.

In some aspects, the techniques described herein relate to a system, wherein the failover command triggers a message to be displayed on user interfaces that access the delayed database cluster, and wherein the message indicates that data retrieved from the delayed database cluster is from a truncated dataset.

In some aspects, the techniques described herein relate to a non-transitory computer readable storage medium, including instructions stored thereon, which instructions, when read and executed by one or more computer processors, cause the one or more computer processors to perform steps including: receiving, at a data management platform, incoming data; writing the incoming data to a primary database cluster; executing an incremental backup operation, wherein the incremental backup operation generates an incremental backup of the primary database cluster; storing the incremental backup of the primary database cluster in a storage location; after a predetermined amount of time, executing an incremental restore operation on a delayed database cluster, wherein the incremental restore operation restores the incremental backup of the primary database cluster to the delayed database cluster; determining a data anomaly in the incoming data; and executing a failover command, wherein the failover command redirects database queries from the primary database cluster to the delayed database cluster.

In some aspects, the techniques described herein relate to a non-transitory computer readable storage medium, wherein the incoming data is streaming data received by a data consumption application, and wherein the data consumption application is configured as a consumer of a distributed event streaming platform.

In some aspects, the techniques described herein relate to a non-transitory computer readable storage medium, wherein the storage location is a network storage location.

In some aspects, the techniques described herein relate to a non-transitory computer readable storage medium, including: executing a full backup operation, wherein the full backup operation generates a full backup of the primary database cluster.

In some aspects, the techniques described herein relate to a non-transitory computer readable storage medium, including: prior to executing the incremental restore operation on the delayed database cluster, initiating a one-time load of static database tables from the primary database cluster to the delayed database cluster.

In some aspects, the techniques described herein relate to a non-transitory computer readable storage medium, including: prior to executing the incremental restore operation on the delayed database cluster and after initiating the one-time load of static database tables from the primary database cluster to the delayed database cluster, executing a full restore operation on the delayed database cluster, wherein the full restore operation restores the full backup of the primary database cluster to the delayed database cluster.

DETAILED DESCRIPTION

Figure 1:
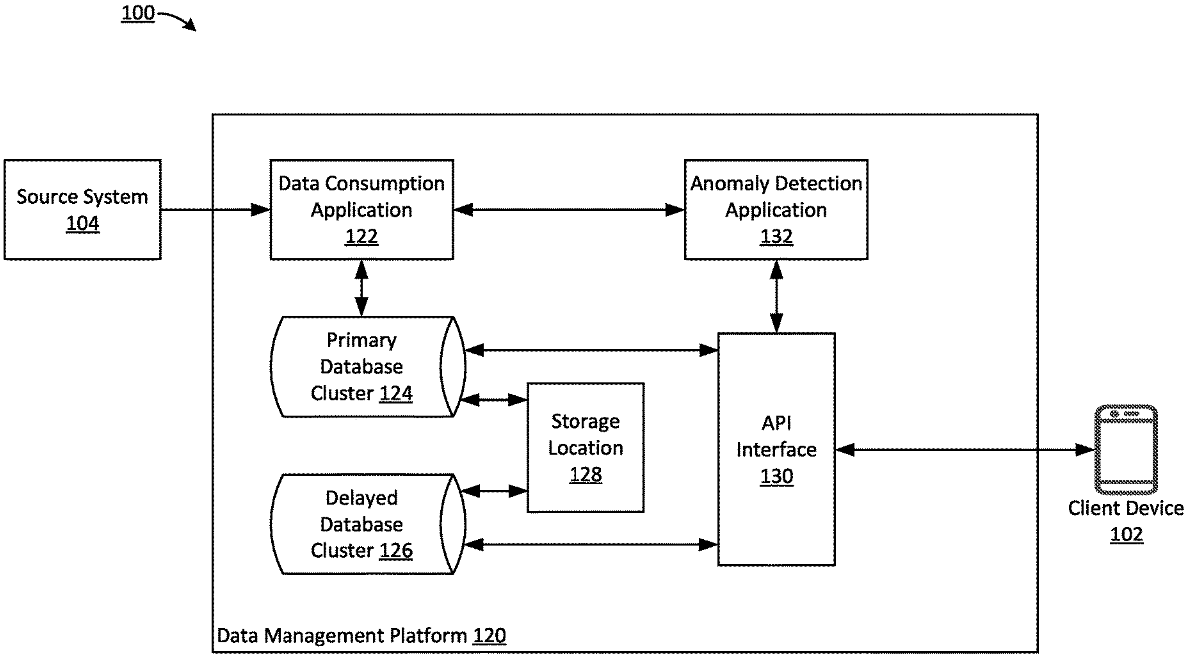
FIG. 1 illustrates a block diagram of a system for providing a delayed database cluster, in accordance with aspects.

Aspects generally relate to systems and methods for providing a delayed database cluster.

In accordance with aspects, an organization may collect data and later provide the collected data for use by users, such as customers, consumers, etc. An exemplary data collection scheme is collection of a consumer's payment product transactions. When an issuing organization issues a payment product, such as a credit card, a debit card, etc., transactions processed using the payment product are collected and stored by the issuing organization. A consumer/customer may then use the issuing organization's provided interfaces to later view historic transactions that have been made using a payment product issued to the consumer. Moreover, transactions may be displayed via a consumer interface in near-real time (i.e., very shortly after a transaction is processed). While transaction data is used as an exemplary data collection scheme, any scenario where data is collected and then made available for later use may benefit from the techniques described herein, and this example is not meant to be limiting.

The initial collection of the data, such as transaction data, may be made via a source system (sometimes referred to as a "system of record," or "SoR"). For instance, in the case of consumer transactions, each transaction is initially recorded by the source transaction processing system that is configured to process the transaction at the issuing organization's backend technology infrastructure after it is received from the point of sale. Apart from systems and logic for processing data as a system of record (e.g., processing of a transaction through the payment network, settlement with the acquirer, etc.), a source system may also publish the data for use with a data consumption application. The purpose of a data consumption application and associated datastores (collectively referred to herein as a data management platform) is to store the data and make the data retrievable for future use, such as viewing, downloading, etc.

A source system may publish the data to a data management platform in any suitable way. For instance, the data may be provided in batches sent on a recurring basis or sent in real-time event messages (e.g., via a messaging queue and bus and/or a distributed event streaming platform such as Apache Kafka®), etc.

In accordance with aspects, a messaging queue may be configured as a queue data structure and may facilitate communication between disparate systems or services (such as a source system and a data management platform). Services may place messages on the queue and may subscribe to and consume messages from the queue. A service or application that submits messages to a messaging queue is referred to as a producer, and a service or application that consumes messages from a messaging queue is referred to as a consumer. In an exemplary aspect, a source system may represent a producer and a data management platform may represent a consumer. The communication may be asynchronous. That is, the messages may be placed on the queue by one service at one time and may be consumed from the queue by another service at another time, and a producer need not wait for a response from a consumer before continuing with other processing tasks. The messaging queue stores the message until the consumer consumes it. The messaging queue may include a message broker. A message broker can translate a message from a protocol or format that it is received in from the producer to a protocol or format that it is consumed in by the consumer.

A distributed event streaming platform (e.g., Apache Kafka®) handles associated events in the form of real time and near-real time streaming data to/from streaming data pipelines and/or streaming applications. Streaming data is data that is continuously generated by a data source (e.g., a source system that, for instance, processes many transactions). An event streaming platform can receive streaming data from multiple sources and process the data sequentially and incrementally. Event streaming platforms can be used in conjunction with real time and near-real time streaming data pipelines and streaming applications. For example, an event streaming platform can ingest and store streaming data from the data pipeline and provide the data to an application that processes the streaming data. An event platform may include partitioned commit logs (each, an ordered sequence of records) to store corresponding streams of records. The logs are divided into partitions, and a subscriber can subscribe to a "topic" that is associated with a partition, and thereby receive all records stored at the partition (e.g., as passed to the subscriber in real time by the platform).

An event streaming platform may expose a producer API that publishes a stream of records from a streaming application or data pipeline to a topic, and a consumer API that a consumer application can use to subscribe to topics and thereby receive the record stream associated with that topic. An event streaming platform may also publish other APIs with necessary or desired functionality. Some event streaming platforms overlap in functionality with messaging queue systems and provide aspects from each type of system.

In accordance with aspects, a data management platform may receive (i.e., consume) data from a source system in any suitable manner. A data consumption application within a data management platform may be configured as a consumer of the data and may be further configured to store (i.e., write) the received data to a primary datastore. A primary datastore may include a database cluster. In accordance with aspects, a database cluster may include multiple database storage instances that are each managed by an associated database engine (also referred to as a database service, server, or node). Each database server in a database cluster may operate in parallel and make writes to its corresponding database storage instance (i.e., the database storage structure such as a relational structure, a NoSQL structure, etc.). The various database instances and corresponding database engines may be distributed across various storage devices, which may be in different datacenters in different geographic locations. A database cluster may include a central database engine that monitors and controls the writing and access of data in the cluster system. Conventionally, database clusters offer more throughput for create, read, update, and delete (CRUD) operations and provide data redundancy in the case of a hardware or software failure.

In accordance with aspects, a data management platform may include a primary database cluster and a delayed database cluster. A primary database cluster may function conventionally, as described above. That is, a data consumption application may receive data from a source system and may be configured to write the data to the primary database cluster. A delayed database cluster, however, may be written to with incremental backups of the primary database cluster.

In accordance with aspects, incremental backups of a primary database cluster may be taken at predetermined time intervals. An incremental backup copies data that has changed since the last backup was taken. An incremental backup series may begin with a full backup, and then make incremental backups that record data that has changed since the last full or incremental backup. "Changed" data includes any new or modified data since the last backup. A backup scheme may be set to take incremental backups of a primary database cluster at predetermined time intervals, such as every hour, every four hours, every eight hours, etc. Backups may be sent to a network location for storage. A data management platform may be in operative communication with the network storage location where backups are stored.

In accordance with aspects, a data management platform may be configured to restore incremental backups of a primary database cluster to a delayed database cluster on a predetermined schedule. The backup restoration schedule may be a set time interval (i.e., a delayed time interval) behind the time when the backup was taken. For instance, an incremental back may be restored to (i.e., applied to) a delayed database cluster a set number of minutes or hours (e.g., 30 minutes, 60 minutes, 8 hours, 12 hours, 24 hours, etc.) after the backup is taken from the primary database cluster. Accordingly, the delayed database cluster may include a dataset that is delayed by the determined time interval between when the backup was taken from the primary database cluster and when the backup was applied to delayed database cluster. In the case where a data anomaly, such as corrupt data being consumed by the data management platform, is detected within the timeframe between a backup of the primary cluster, and that backup's restoration to the delayed cluster, the delayed backup cluster may be used to provide uncorrupted, even if not up-to-date, data to users.

In accordance with aspects, a delayed cluster may initially be loaded with a one-time load of static tables (e.g., the schema) from the primary database cluster, and the have a full backup of the primary cluster restored to the delayed cluster. Thereafter, the stored incremental backups may be applied to the delayed database cluster after the expiration of an applicable delayed time interval. In some aspects, the data stored in a delayed database cluster may be assigned a time to live (TTL), after which, the data is deleted from the delayed cluster. A TTL may define a rolling window. For instance, a TTL may remove all data that is more than, e.g., 2 months old, 6 months old, etc., from the delayed cluster. Accordingly, a delayed cluster may house only a window of historical data from the point of the most recent incremental backup application and backwards to the extent of the TTL parameter. This may reduce storage capacity requirements while still providing a relatively more relevant window of data in a failover situation to the delayed database cluster.

In accordance with aspects, a data management platform may continuously monitor for data anomalies with respect to data that is being received by the platform and being written to the primary database cluster. For example, a data management platform may include an anomaly detection application that continuously monitors incoming data for anomalistic patterns or other problematic scenarios with respect to consumed data. Data issues that may be monitored for include receipt of corrupted data, that is data that is totally or partially unreadable or data that does not conform to a particular format which the data management platform is configured to consume. Examples of data anomalies/corruption include corruption due to encryption/decryption operations (e.g., such as corrupted encryption keys), corruption or format issues with respect to logic/coding, data corrupted through a read, write, or other CRUD operation, etc.

An anomaly detection application may continuously monitor database logs, the anomaly detection application's own application logs, logs from event streaming and/or message queue applications, and any other suitable record of data consumption and CRUD operations on consumed data to determine anomalistic scenarios. When an anomalistic scenario or pattern is detected, an anomaly detection application may send a communication to an application programming interface (API) interface to fail over (i.e., switch data retrieval operations) from the primary database cluster to the delayed database cluster. In accordance with aspects, an API interface may maintain live and ready connections to both the primary database cluster and the delayed database cluster, such that a failover operation may need only change a location or identifier of the datastore without initializing a connection to the datastore in order to reduce downtime. Accordingly, downtime may be minimal or even unnoticeable to users.

In accordance with aspect, and as described above, a delayed database cluster may include only a timeframe of historic data, where the timeframe is defined by a sliding window. Thus, when a failover to a delayed database occurs, an API interface may be configured to automatically generate a message to users that the data being viewed is temporarily truncated version of a larger dataset. The API may be configured to display such a message on a user interface of a client device that accesses the data.

In accordance with aspects, once a detected anomalistic data scenario has been addressed and remedied, an API interface may be configured, either manually or automatically, to restore the connection to the primary database cluster. This operation may further be configured to cease sending any message to user interfaces indicating that truncated data is temporarily being provided.

FIG. 1 illustrates a block diagram of a system for providing a delayed database cluster, in accordance with aspects. System 100 include client device 102, source system 104, and data management platform 120. Data management platform 120 includes data consumption application 122, primary database cluster 124, delayed database cluster 126, storage location 128, API interface 130, and anomaly detection application 132.

In accordance with aspects, data consumption application 122 may receive data from source system 104 in any suitable manner. For instance, source system 104 may send data to data consumption application 122 in periodic batches, as a producer application to an event streaming or message queuing application, etc. Data consumption application 122 may be correspondingly configured to receive data from source system 104, such as a consumer application of an event streaming application, etc.

Data consumption application 122 may receive data from source system 104 and write received data to primary database cluster 124. Primary database cluster 124 may be a database cluster as described herein. Primary database cluster 124 may be a primary source of data for user applications that require access to data stored in primary database cluster 124. Primary database cluster 124 may be any suitable type of datastore, such as a relational database, a NoSQL database, a data lake, a data warehouse, etc.

Primary database cluster 124 may be configured to undergo routine backup operations including incremental backups and/or full backups that are scheduled to execute on a predetermined time interval. Backup operations and backup restoration operations may be executed by one or more database engines included in primary database cluster 124 or delayed database cluster 126 or may be executed by third-party software that interfaces with one or more database engines of primary database cluster 124 or delayed database cluster 126.

Executed backups of primary database cluster 124 may be copied to and stored at storage location 128. Storage location 128 may be a network storage location, a cloud-based storage location, or any storage location that primary database cluster 124 and delayed database cluster 126 are in operative communication with.

Backups stored at storage location 128 may be applied to (i.e., restored to) delayed database cluster 126 on a periodic basis (e.g., a predetermined periodic basis), as described, above. For instance, a backup restoration schedule may be a set time interval (i.e., a delayed time interval) that defines an amount of time that has elapsed since the time when a particular backup was made. For instance, an incremental back may be restored to (i.e., applied to) delayed database cluster 126 a set number of minutes or hours (e.g., 30 minutes, 60 minutes, 8 hours, 12 hours, 24 hours, etc.) after the backup is taken from primary database cluster 124. Accordingly, after a scheduled restoration of an incremental backup from primary database cluster 124 and to delayed database cluster 126, delayed database cluster 126 may include a dataset that is aged by the determined time interval between when the backup was taken from primary database cluster 124 and when the backup was applied to delayed database cluster 126.

In accordance with aspects, API interface 130 may interface with primary database cluster 124, delayed database cluster 126, and anomaly detection application 132. Anomaly detection application 132 may continuously monitor data consumption application 122 and/or delayed database cluster 126 to determine an instance or a pattern of corrupted, unreadable, and/or improperly formatted data (this and other instances or patterns of unexpected or unrecognized data are referred to herein as a data anomaly) received by data consumption application 122 and/or written to primary database cluster 124.

Upon a determination of a data anomaly by anomaly detection application 132, anomaly detection application 132 may send a communication to API interface 130. The communication may instruct API interface 130 to execute a failover operation. The failover operation may direct all data queries away from primary database cluster 124 and to delayed database cluster 126. Accordingly, all client applications that retrieve data from data management platform 120 may have database queries redirected away from primary database cluster 124 and to delayed database cluster 126 until API interface 130 receives a second command to direct database queries back to primary database cluster 124.

While a failover command is in place and data is being retrieved from delayed database cluster 126, API interface 130 may be further configured to provide a message to all client applications and/or client interfaces (e.g., applications/interfaces executing on client device 102) that retrieve data from delayed database cluster 126. The automated message may indicate that retrieved data is a truncated set of data, as described in more detail, herein.

Figure 2:
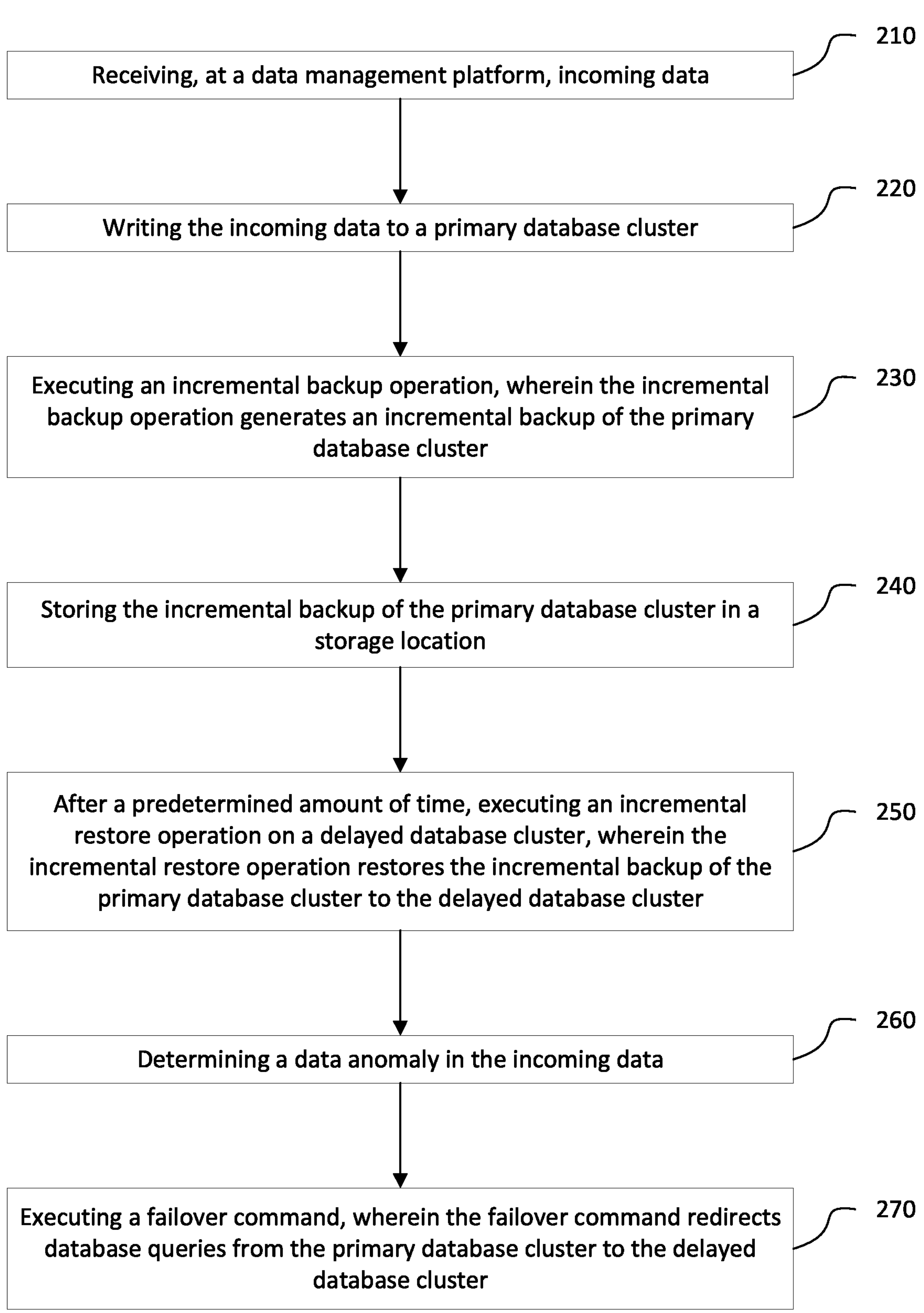
FIG. 2 illustrates a logical flow for providing a delayed database cluster, in accordance with aspects.

FIG. 2 illustrates a logical flow for providing a delayed database cluster, in accordance with aspects.

Step 210 includes receiving, at a data management platform, incoming data.

Step 220 includes writing the incoming data to a primary database cluster.

Step 230 includes an incremental backup operation, wherein the incremental backup operation generates an incremental backup of the primary database cluster.

Step 240 includes storing the incremental backup of the primary database cluster in a storage location.

Step 250 includes after a predetermined amount of time, executing an incremental restore operation on a delayed database cluster, wherein the incremental restore operation restores the incremental backup of the primary database cluster to the delayed database cluster.

Step 260 includes determining a data anomaly in the incoming data.

Step 270 includes executing a failover command, wherein the failover command redirects database queries from the primary database cluster to the delayed database cluster.

Figure 3:
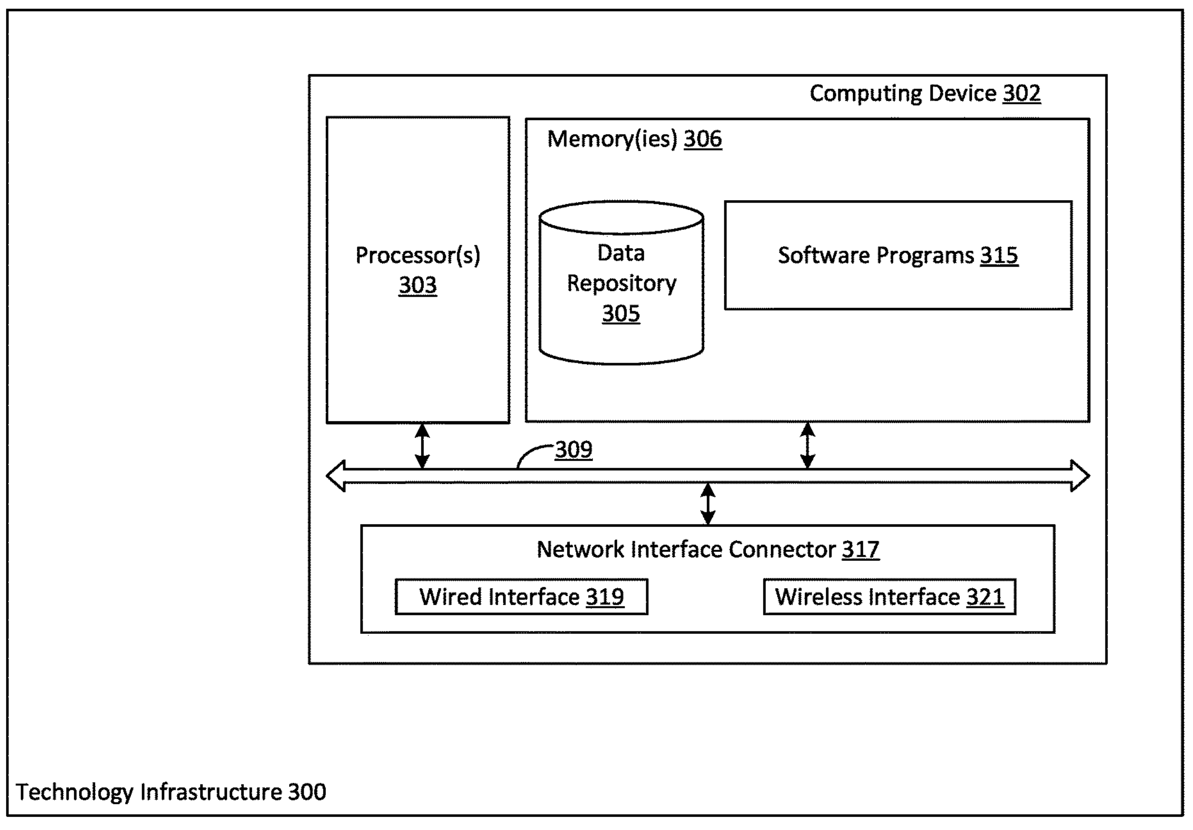
FIG. 3 illustrates a block diagram of a technology infrastructure and computing device for implementing certain aspects of the present disclosure, in accordance with aspects.

FIG. 3 illustrates a block diagram of a technology infrastructure and computing device for implementing certain aspects of the present disclosure, in accordance with aspects. FIG. 3 includes technology infrastructure 300. Technology infrastructure 300 represents the technology infrastructure of an implementing organization. Technology infrastructure 300 may include hardware such as servers, client devices, and other computers or processing devices. Technology infrastructure 300 may include software (e.g., computer) applications that execute on computers and other processing devices. Technology infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

In accordance with aspects, system components such as a source system, a data consumption application, an anomaly detection application, a database cluster, client devices, servers, various database engines and database services, and other computer applications and logic may include, and/or execute on, components and configurations the same, or similar to, computing device 302.

Computing device 302 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

receiving, at a data management platform, incoming data;

writing the incoming data to a primary database cluster;

executing an incremental backup operation, wherein the incremental backup operation generates an incremental backup of the primary database cluster;

storing the incremental backup of the primary database cluster in a storage location;

after a predetermined amount of time, executing an incremental restore operation on a delayed database cluster, wherein the incremental restore operation restores the incremental backup of the primary database cluster to the delayed database cluster;

providing the incremental backup to a user to provide the user with access to at least a portion of the incoming data from the delayed database cluster;

assigning a time-to-live (TTL) to data stored in the delayed database cluster, wherein the TTL defines a rolling window and data older than the TTL is deleted from the delayed database cluster;

determining a data anomaly in the incoming data; and executing a failover command through an application programming interface (API), wherein the failover command redirects database queries from the primary database cluster to the delayed database cluster; and triggering a message to be generated by the API and displayed by the API on a user interface of a client device that accesses the delayed database, and wherein the message indicates that data retrieved from the delayed database cluster is from a temporarily truncated dataset; and upon the data anomaly being resolved, ceasing the message.

2. The method of claim 1, wherein the incoming data is streaming data received by a data consumption application, and wherein the data consumption application is configured as a consumer of a distributed event streaming platform.

3. The method of claim 1, wherein the storage location is a network storage location.

4. The method of claim 1, comprising:

executing a full backup operation, wherein the full backup operation generates a full backup of the primary database cluster.

5. The method of claim 4, comprising:

prior to executing the incremental restore operation on the delayed database cluster, initiating a one-time load of static database tables from the primary database cluster to the delayed database cluster.

6. The method of claim 5, comprising:

prior to executing the incremental restore operation on the delayed database cluster and after initiating the one-time load of static database tables from the primary database cluster to the delayed database cluster, executing a full restore operation on the delayed database cluster, wherein the full restore operation restores the full backup of the primary database cluster to the delayed database cluster.

7. The method of claim 1, wherein a second command through the API interface causes the API interface to direct the database queries back to the primary database cluster.

8. A system comprising at least one computer including a processor and a memory, wherein the at least one computer is configured to:

receive, at a data management platform, incoming data;

write the incoming data to a primary database cluster;

execute an incremental backup operation, wherein the incremental backup operation generates an incremental backup of the primary database cluster;

store the incremental backup of the primary database cluster in a storage location;

after a predetermined amount of time, execute an incremental restore operation on a delayed database cluster, wherein the incremental restore operation restores the incremental backup of the primary database cluster to the delayed database cluster;

provide the incremental backup to a user to provide the user with access to at least a portion of the incoming data from the delayed database cluster;

assign a time-to-live (TTL) to data stored in the delayed database cluster, wherein the TTL defines a rolling window and data older than the TTL is deleted from the delayed database cluster;

determine a data anomaly in the incoming data; and execute a failover command through an application programming interface (API), wherein the failover command redirects database queries from the primary database cluster to the delayed database cluster;

trigger a message to be generated by the API and displayed by the API on a user interface of a client device that accesses the delayed database, and wherein the message indicates that data retrieved from the delayed database cluster is from a temporarily truncated dataset; and upon the data anomaly being resolved, cease the message.

9. The system of claim 8, wherein the incoming data is streaming data received by a data consumption application, and wherein the data consumption application is configured as a consumer of a distributed event streaming platform.

10. The system of claim 8, wherein the storage location is a network storage location.

11. The system of claim 8, comprising:

executing a full backup operation, wherein the full backup operation generates a full backup of the primary database cluster.

12. The system of claim 11, wherein the at least one computer is configured to:

prior to executing the incremental restore operation on the delayed database cluster, initiate a one-time load of static database tables from the primary database cluster to the delayed database cluster.

13. The system of claim 12, wherein the at least one computer is configured to:

prior to executing the incremental restore operation on the delayed database cluster and after initiating the one-time load of static database tables from the primary database cluster to the delayed database cluster, execute a full restore operation on the delayed database cluster, wherein the full restore operation restores the full backup of the primary database cluster to the delayed database cluster.

14. The system of claim 8, wherein a second command through the API interface causes the API interface to direct the database queries back to the primary database cluster.

15. A non-transitory computer readable storage medium, including instructions stored thereon, which instructions, when read and executed by one or more computer processors, cause the one or more computer processors to perform steps comprising:

receiving, at a data management platform, incoming data;

writing the incoming data to a primary database cluster;

executing an incremental backup operation, wherein the incremental backup operation generates an incremental backup of the primary database cluster;

storing the incremental backup of the primary database cluster in a storage location;

after a predetermined amount of time, executing an incremental restore operation on a delayed database cluster, wherein the incremental restore operation restores the incremental backup of the primary database cluster to the delayed database cluster;

providing the incremental backup to a user to provide the user with access to at least a portion of the incoming data from the delayed database cluster;

assigning a time-to-live (TTL) to data stored in the delayed database cluster, wherein the TTL defines a rolling window and data older than the TTL is deleted from the delayed database cluster;

determining a data anomaly in the incoming data; and executing a failover command through an application programming interface (API), wherein the failover command redirects database queries from the primary database cluster to the delayed database cluster;

trigger a message to be generated by the API and displayed by the API on a user interface of a client device that accesses the delayed database, and wherein the message indicates that data retrieved from the delayed database cluster is from a temporarily truncated dataset; and upon the data anomaly being resolved, cease the message.

16. The non-transitory computer readable storage medium of claim 15, wherein the incoming data is streaming data received by a data consumption application, and wherein the data consumption application is configured as a consumer of a distributed event streaming platform.

17. The non-transitory computer readable storage medium of claim 15, wherein the storage location is a network storage location.

18. The non-transitory computer readable storage medium of claim 15, comprising:

executing a full backup operation, wherein the full backup operation generates a full backup of the primary database cluster.

19. The non-transitory computer readable storage medium of claim 18, comprising:

prior to executing the incremental restore operation on the delayed database cluster, initiating a one-time load of static database tables from the primary database cluster to the delayed database cluster.

20. The non-transitory computer readable storage medium of claim 19, comprising:

prior to executing the incremental restore operation on the delayed database cluster and after initiating the one-time load of static database tables from the primary database cluster to the delayed database cluster, executing a full restore operation on the delayed database cluster, wherein the full restore operation restores the full backup of the primary database cluster to the delayed database cluster.

* * * * *